United States Patent
Guillot et al.

(10) Patent No.: US 9,163,147 B2
(45) Date of Patent: Oct. 20, 2015

(54) USE OF GLYCEROL AS AN AGENT TO IMPROVE THE SELF-DISPERSING PROPERTIES OF A MINERAL MATERIAL TO BE ADDED TO AN AQUEOUS COMPOSITION

(75) Inventors: Murielle Guillot, Caluire et Cuire (FR); Denis Ruhlmann, Genay (FR); Matthias Buri, Rothrist (CH)

(73) Assignees: COATEX S.A.S., Genay (FR); OMYA INTERNATIONAL AG, Oftringen (CH)

( * ) Notice: Subject to any disclaimer, the term of this patent is extended or adjusted under 35 U.S.C. 154(b) by 575 days.

(21) Appl. No.: 13/518,990

(22) PCT Filed: Dec. 22, 2010

(86) PCT No.: PCT/IB2010/003327
§ 371 (c)(1),
(2), (4) Date: Nov. 13, 2012

(87) PCT Pub. No.: WO2011/077232
PCT Pub. Date: Jun. 30, 2011

(65) Prior Publication Data
US 2013/0056566 A1 Mar. 7, 2013

Related U.S. Application Data

(60) Provisional application No. 61/335,683, filed on Jan. 11, 2010.

(30) Foreign Application Priority Data

Dec. 24, 2009 (FR) ...................... 09 06350

(51) Int. Cl.
*B02C 23/06* (2006.01)
*C09C 1/02* (2006.01)
(Continued)

(52) U.S. Cl.
CPC ................. *C09C 1/021* (2013.01); *B02C 23/06* (2013.01); *B02C 23/14* (2013.01); *C09C 1/36* (2013.01); *C09C 1/40* (2013.01); *C09C 1/407* (2013.01); *C01P 2004/61* (2013.01); *C01P 2004/62* (2013.01); *C01P 2006/12* (2013.01); *C01P 2006/22* (2013.01); *C01P 2006/60* (2013.01)

(58) Field of Classification Search
CPC ........ B02C 17/16; B02C 23/06; B02C 23/14; C09C 1/021; C09C 1/36; C09C 1/40; C09C 1/407; C01P 2004/61; C01P 2004/62; C01P 2006/12; C01P 2006/60; B22F 9/04; B22F 2009/043
USPC ...................................... 241/15, 16
See application file for complete search history.

(56) References Cited

U.S. PATENT DOCUMENTS 3,492,264 A * 1/1970 Hahn ............................ 524/577
3,531,310 A * 9/1970 Ross et al. .................... 106/436
(Continued)

FOREIGN PATENT DOCUMENTS

FR 2 896 171 A1 7/2007
JP 2013-512774 A 4/2013
(Continued)

OTHER PUBLICATIONS

U.S. Appl. No. 14/220,151, filed Mar. 20, 2014, Guillot, et al.
(Continued)

*Primary Examiner* — Faye Francis
*Assistant Examiner* — Onekki Jolly
(74) *Attorney, Agent, or Firm* — Oblon, McClelland, Maier & Neustadt, L.L.P.

(57) ABSTRACT

The present disclosure describes methods for improving the auto-dispersant characteristic in water of mineral substances, such methods involving dry-grinding of a mineral substance in the presence of a formulation. In some embodiments the formulation includes glycerol and at least one agent in aqueous or pure form. In other embodiments the formulation includes an aqueous polyglycerol.

23 Claims, 1 Drawing Sheet

(51) Int. Cl.
  *B02C 23/14* (2006.01)
  *C09C 1/36* (2006.01)
  *C09C 1/40* (2006.01)

(56) References Cited

U.S. PATENT DOCUMENTS

| | | | | |
|---|---|---|---|---|
| 3,649,323 | A * | 3/1972 | Roe et al. | 106/448 |
| 3,927,837 | A * | 12/1975 | Clark | 241/46.11 |
| 6,242,499 | B1 * | 6/2001 | Gruning et al. | 514/785 |
| 2007/0221764 | A1 | 9/2007 | Tran et al. | |
| 2008/0287554 | A1 | 11/2008 | Gittins et al. | |
| 2010/0210182 | A1 | 8/2010 | Tran et al. | |
| 2010/0222484 | A1 | 9/2010 | Buri et al. | |
| 2011/0133006 | A1 | 6/2011 | Guillot et al. | |
| 2012/0237433 | A1 | 9/2012 | Gane et al. | |

FOREIGN PATENT DOCUMENTS

| | | |
|---|---|---|
| JP | 2013-512775 A | 4/2013 |
| KR | 10-2008-0036117 A | 4/2008 |
| KR | 10-2008-0090514 A | 10/2008 |
| KR | 10-2009-0016603 A | 2/2009 |
| WO | WO 2006/100510 A1 | 9/2006 |
| WO | WO 2007/109328 A2 | 9/2007 |

OTHER PUBLICATIONS

Office Action issued Sep. 2, 2014 in Japanese Patent Application No. 2012-545465 (English language translation only).
International Search Report issued Apr. 7, 2011, in PCT/IB2010/003327 (with English-language translation).
French Preliminary Search Report issued May 27, 2010, in Patent Application No. FR 0906350 (with English Translation of Category of Cited Documents).
R. Paramasivam, et al., "Effects of the physical properties of liquid additives on dry grinding", Powder Technology, vol. 70, No. 1, XP 000319358, Jan. 1992, pp. 43-50.
Hiroshi Takahashi, "*Wet Grinding on Kaolin Minerals*", Bulletin of the Chemical Society of Japan, vol. 32, No. 4, XP 002583734, Apr. 1959, pp. 381-387.
Office Action issued Oct. 25, 2013, in Korean Patent Application No. 10-2012-7018783.

* cited by examiner

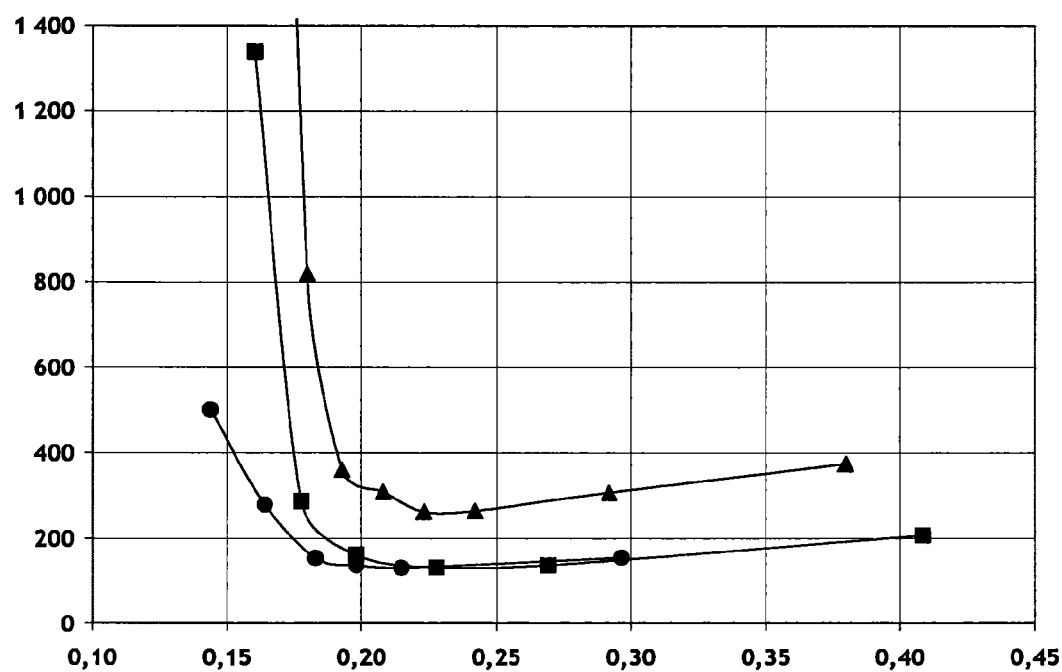

USE OF GLYCEROL AS AN AGENT TO IMPROVE THE SELF-DISPERSING PROPERTIES OF A MINERAL MATERIAL TO BE ADDED TO AN AQUEOUS COMPOSITION

CROSS-REFERENCE TO RELATED APPLICATIONS

This application is a National Stage of PCT/IB2010/003327 filed on Dec. 22, 2010, which claims priority it U.S. Provisional Application No. 61/335,683 filed on Jan. 11, 2010. This application is based upon and claims to the benefit of priority to French Application No. 09 06350 filed on Dec. 24, 2009.

The present invention describes a technical solution for facilitating the dispersion of certain mineral substances (including natural calcium carbonate) initially dry-ground and intended to be used in an aqueous composition such as an aqueous suspension, a paint or a coating dispersion.

This solution is based on the use during the dry-grinding step of formulations containing glycerol and/or polyglycerols. It therefore fits in with the concepts of "green chemistry" and "sustainable development", with glycerol being a renewable, non-fossil energy derived resource. In addition to the ease of water dispersion, the proposed solution results in a significant reduction in the production of foam during the water dispersion phase of the mineral substance which is crucial in applications such as aqueous paints and paper coating.

The mineral industry is today a major consumer of chemicals. They are used in the various steps of transformation/modification/processing to which mineral substances are subjected. The dry-grinding of mineral substances, including natural calcium carbonate, is one of these steps.

This grinding is carried out in presence of so-called "grinding aid" agents whose function is to facilitate the mechanical action of grinding as described above. They are presented in a very general manner in the documents "Calcium Carbonate" (Birkhäuser Verlag, 2001) and "Beitrag zur Aufklärung der Wirkungsweise von Mahlhilfsmitteln" (Freiberger Forschungshefte, VEB Deutscher Verlag für Grundstoffundustrie, Leipzig, Germany, 1975).

The prior art is particularly rich on the subject of such additives that can be classified into 3 categories: the Brönstedt weak acids, the Brönstedt weak bases and the Lewis bases. The first group dedicated to the Brönstedt weak acids contains formic, acetic, lactic, lignitic, adipic, lactic acids, the fatty acids and in particular palmitic and stearic acids, but also some of the salts of these acids such as the salts of lignin sulphonate. Illustrations of it are found in documents WO 2005/063399 and FR 2 203 670.

The second group consists of the Brönstedt weak bases. It includes particularly the alkanolamines, including TIPA (triisopropanolamine) and TEA (triethanolamine), well known to the person skilled in the art. In this regard, reference can be made to documents EP 0 510 890 and GB 2 179 268.

The Lewis bases are the third group of dry-grinding aid agents, and contain alcohols. They are ethylene glycol, diethylene glycol, triethylene glycol, propylene glycol and dipropylene glycol. Documents WO 2002/081 573 and US 2003/019 399 for example describe the use of diethylene glycol as dry-grinding aid agents in their table 1. Document WO 2005/071 003 refers to a polyhydric alcohol corresponding to ethylene glycol. Document WO 2005/026 252 describes a dry-grinding agent that can be a triethanolamine, a polypropylene glycol or an ethylene glycol.

It must be recognized that even today, these glycol-based products are the ones most used for the dry grinding of natural calcium carbonate, among which the use of propylene glycol (or monopropylene glycol) is the most widespread. These additives are in fact known for their effectiveness in facilitating the grinding processes and for their low cost.

However, such products are not free of volatile organic compounds (VOCs). As a consequence, calcium carbonate ground with these additives is itself a carrier of VOCs, with a portion of the grinding aid agent remaining fixed to/absorbed by the surface of the mineral particle. This VOC content constitutes a barrier to the use of such minerals in applications where regulations no longer allow any volatile organic compounds. This is particularly the case for many applications in the aqueous phase, such as paints, where European Directives 1999/13/EC (Solvent Emission Directive) and 2004/42/EC (Limitation of VOC emissions related to the use of solvents in decorative paints) specifically limit VOC emissions related to the manufacture and uses of paints.

To this environmental requirement must be added a technical constraint: the search for an auto-dispersant characteristic in an aqueous composition for the mineral substances in question. Concretely, this means that the said mineral substance, after having been ground, is intended in certain cases to be used in the composition of an aqueous formulation; it must therefore be dispersed in water. This is for example the case with aqueous paints or paper coating dispersions which can incorporate natural calcium carbonates resulting from a dry grinding step.

This so-called auto-dispersing characteristic is all the more marked, as can be observed once the said mineral substance is introduced into an aqueous composition:

a viscosity that is as both as low as possible, measured immediately after the operation of introduction into water and of mixing, which characterizes a good initial dispersion state, and an evolution of the viscosity over the course of the shortest possible time, reflecting the good rheological stability of the aqueous composition thus produced.

Such a requirement is found in all applications in an aqueous medium of the mineral substance in question: it is for example the case of aqueous suspensions, of paints and of paper coating dispersions. To this requirement must be added the need to limit the phenomenon of foaming which appears in the course of the dispersion of the mineral substance in water, specifically due to the effect of agitation of the medium. Besides its unsightly appearance, this foam is at the origin of the problem of stability and of phase separations, particularly with aqueous paints and paper coating dispersions incorporating calcium carbonates resulting from a dry grinding step.

Also, pursuing her research with a view to improving the auto-dispersant characteristic in an aqueous medium of mineral substances resulting from a dry-grinding step, the Applicant has developed the use of formulations containing glycerol and/or polyglycerols as dry-grinding agents for the said mineral substances.

Surprisingly, these formulations enable an improvement in the auto-dispersant characteristics of the said mineral substances once introduced into an aqueous composition. This means that, with regard to a composition incorporating the same mineral substance dry-ground with propylene glycol or polyethylene glycol, its immediate viscosity is decreased and the stability of this viscosity is improved over time. In addition, the amount of foam resulting from the suspension in water operation is significantly reduced.

The Applicant indicates that she is aware of document WO 2007/138410 which propose the use of low molecular weight polyalkylene glycols as calcium carbonate dry-grinding agents: these products are presented as effective for the dry-grinding of calcium carbonate, and as being VOC-free. This being so, the said polyalkylene glycols are not derived from renewable raw materials: their price, which is indexed to the barrel of crude oil, is very high at present.

With respect to glycerol used as a dry-grinding aid agent, the Applicant indicates that she knows documents WO 2006/132 762 and WO 2007/109 328. Glycerol is a product derived from the transformation of vegetable or animal oils (saponification, trans-esterification and fatty acid synthesis). It is a renewable natural resource and one that is available in large quantities. It represents a VOC-free alternative that is very advantageous from the viewpoint of the environment and the preservation of our natural resources, something that is not permitted with the polyethylene glycols (PEG), all of which are derived from the synthetic pathway.

However, these documents, focused on the dry-grinding of cement, contain no examples, do not concern the problem of the auto-dispersing characteristic of a mineral substance, and do not in any way focus on paints or paper coating dispersions. Glycerol is known as a grinding additive, as described in the dissertation entitled "Understanding of the physicochemical mechanisms involved in the dry-grinding of calcium carbonate in the presence of a grinding agent" by Mathieu Skrzypczak (Ecole Centrale de Lyon, 2009). However, the document makes no reference to the auto-dispersant characteristic of the ground material thus obtained in an aqueous composition.

Finally, the Applicant knows of the yet unpublished French application bearing the application number FR 09 5868: it focuses on the use of glycerol in a mineral substance grinding process with the very specific function of increasing grinding capacity and reducing specific grinding energy consumption (grinding energy per se, but also classification energy) in order to obtain a specific particle size. This document makes no reference to the auto-dispersant characteristic of the ground material thus obtained in an aqueous composition.

The Applicant also wishes to mention patent application EP 09 015 129.1 that defines a classification process for mineral substances using a classification aid additive comprised of glycerol and/or at least one polyglycerol to increase classification efficiency by air or involving a reduced specific classification energy in comparison with a classification by air without additive, enabling the use of the classified product in various environments, such as hydrophilic environments, for example. This document makes no reference to the auto-dispersant characteristic of the ground material thus obtained in an aqueous composition.

Also, seeking to improve the auto-dispersing characteristic of a mineral substance in an aqueous composition while reducing the phenomenon of induced foam, it being understood that the said mineral substance originates from a dry grinding step, the Applicant has developed the use of formulations containing glycerol and/or polyglycerols during the said dry grinding step of the said mineral substance.

The invention therefore consists of the use during a mineral substance dry grinding step of formulations containing glycerol and/or polyglycerols as agents improving the auto-dispersing characteristic of the said mineral substance in an aqueous composition.

It is well understood that the auto-dispersing characteristic means "with regard to the same aqueous composition, incorporating the same mineral substance, resulting from the same dry-grinding step, but in the presence of a grinding aid agent of the prior art". As already explained, the auto-dispersing characteristic is evaluated, for the aqueous composition in which the dry-ground mineral substance is introduced, by means of an immediate measurement of the viscosity (or after 24 hours) and by the evolution of this viscosity over time.

A first object of the invention is thus the use, as an agent for improving the auto-dispersant characteristic in water of a mineral substance chosen from among the dolomites, talc, titanium dioxide, alumina, kaolin and calcium carbonate, with formulations characterized:
in that they:
  (i) consist of glycerol in the aqueous or pure form, or
  (ii) consist of glycerol with one or more of the following agents: ethylene glycol, monopropylene glycol, triethylene glycol, an inorganic acid or a salt of an inorganic acid, formic or citric acid or a salt of formic or citric acid, an organic polyacid or the salt of an organic polyacid, an alkanolamine, a polyethylenimine, a polyalkylene glycol polymer with a molecular weight between 200 g/mol and 20,000 g/mole, preferentially between 600 g/mol and 6,000 g/mole, a carbohydrate with a root mean square of the radius of gyration less than or equal to the modal radius of the mineral substance, one or several polyglycerols, the said agent or agents being in the aqueous or pure form,
  (iii) include one or more polyglycerols in the absence of glycerol,
and in that they are used in at least one step of the dry-grinding of the said mineral substance.

The expression in the pure form means that the formulation containing the product in question does not contain any other product.

This use can be described in 5 variations depending on the form and nature of the grinding aid agent:
  first variant: glycerol in the pure form
  second variant: glycerol in the aqueous form
  third variant: glycerol in combination with at least one of the compounds listed in point (ii) in the aqueous or pure form
  fourth variant: with one or more polyglycerols
  fifth variant: one or more polyglycerols in the pure form
  sixth variant: one or more polyglycerols in an aqueous formulation.

In a first variant, this use is also characterized in that the said formulations consist of glycerol in the pure form.

In a second variant, this use is also characterized in that the said formulations consist of water and glycerol.

According to this second variant, this use is also characterized in that the said formulations contain from 25% to 95%, preferentially from 45% to 90%, very preferentially from 75% to 85% by weight of glycerol with respect to their total weight, with the complement being constituted by water.

In a third variant, this use is also characterized in that the said formulations consist of glycerol with one or more of the said agents in the aqueous or pure form.

According to this third variant, this use is also characterized in that the said inorganic acid is a phosphoric acid.

According to this third variant, this use is also characterized in that the said acid salt of an inorganic acid is a mono, di or trialkaline salt, and preferentially is a cation salt of Group I or II of the Periodic Table of the Elements.

According to this third variant, this use is also characterized in that the said acid salt of formic or citric acid is a mono, di or trialkaline salt, and preferentially is a cation salt of Group I or II of the Periodic Table of the Elements.

According to this third variant, this use is also characterized in that the said organic polyacid is of the formula COOH—(CH$_2$)$_n$—COOH, where n is an integer with a value between 0 and 7 inclusive, or is a mono or dialkaline salt of the organic polyacid of the formula COOH—(CH$_2$)n-COOH, where n is equal to an integer with a value between 0 and 7 inclusive, or is an polymeric organic polyacid of one or more of the following monomers in the acidic or partially or completely neutralized form, with one or more cations of Group I or II of the Periodic Table of the Elements: acrylic, methacrylic, maleic itaconic, or preferentially is an oxalic acid, a pimelic acid or an adipic acid.

According to this third variant, this use is also characterized in that the said alkanolamine is chosen from among 2-amino-2-methyl-1-propanol, 2-amino-2-ethyl-1,3-propanediol, triethanolamine, N-butyldiethanolamine and triisopropanolamine, neutralized or not, and is preferentially selected from among their forms that are neutralized by means of a salt of formic or citric acid or a salt of organic polyacid.

According to this third variant, this use is also characterized in that the said polyalkylene glycol polymer is a polyethylene glycol, a polypropylene glycol or an ethylene-propylene glycol copolymer, random or block.

According to this third variant, this use is also characterized in that the said carbohydrate having a root mean square of the radius of gyration of the said carbohydrate less than or equal to the modal radius of the mineral substance is glucose, fructose, sucrose, starch or cellulose, and is preferentially sucrose.

According to this third variant, this use is also characterized in that the polyglycerol or polyglycerols are chosen from diglycerol, triglycerol, tetraglycerol, pentaglycerol, hexaglycerol, heptaglycerol, octaglycerol, nonaglycerol and decaglycerol and their mixtures, and preferentially from among the di and triglycerols.

According to this third variant, this use is also characterized in that the said formulations contain from 20% to 95% by weight of glycerol, from 1% to 50% by weight of the said agent, and from 0% to 65% by weight of water, preferentially from 30% to 90% by weight of glycerol, from 10% to 45% by weight of the said agent, and from 0% to 60% by weight of water, very preferentially from 35% to 75% by weight of glycerol, from 30% to 40% by weight of the said agent, and from 5% to 50% by weight of water in relation to their total weight, the sum of the percentages by weight of glycerol, of the said agent and of water each time being equal to 100%.

In a fourth variant, this use is characterized in that the said formulations include one or more polyglycerols in the absence of glycerol.

This polyglycerol or these polyglycerols are preferentially chosen from among diglycerol, triglycerol, tetraglycerol, pentaglycerol, hexaglycerol, heptaglycerol, octaglycerol, nonaglycerol and decaglycerol and their mixtures, and preferentially from among the di and triglycerols.

According to a fifth variant, this use is also characterized in that the said formulations consist of one or more polyglycerols in the pure form.

According to this fifth variant, this use is also characterized in that the polyglycerol or polyglycerols are chosen from among diglycerol, triglycerol, tetraglycerol, pentaglycerol, hexaglycerol, heptaglycerol, octaglycerol, nonaglycerol and decaglycerol and their mixtures, and preferentially from among the di and triglycerols.

According to a sixth variant, this use is also characterized in that the said formulations consist of water and one or more polyglycerols.

According to this sixth variant, this use is also characterized in that the said formulations contain from 25% to 95%, preferentially from 45% to 90%, very preferentially from 75% to 85% by weight of glycerol with respect to their total weight, with the complement being constituted by water.

According to this sixth variant, this use is also characterized in that the polyglycerol or polyglycerols are chosen from among diglycerol, triglycerol, tetraglycerol, pentaglycerol, hexaglycerol, heptaglycerol, octaglycerol, nonaglycerol and decaglycerol and their mixtures, and preferentially from among the di and triglycerols.

In general, this use is also characterized in that it is implemented at 100 to 5,000 ppm, preferentially at 500 to 3,000 ppm of glycerol or polyglycerol in relation to the dry weight of the said mineral substance.

In general, this use is also characterized in that it is implemented at between 0.1 and 1 mg, and preferentially between 0.2 and 0.6 mg dry equivalent total of the said glycerol or polyglycerol and any possible agent per m$^2$ of the mineral substance.

In general, this use is also characterized in that the said mineral substance is ground to an average diameter measured by a Sedigraph™ 5100 of between 0.5 and 10 μm, preferentially between 1 μm and 5 μm.

In general, this use is also characterized in that the said mineral substance is ground to the point of obtaining a percentage by weight of particles with a diameter less than 2 μm, as measured by a Sedigraph™ 5100, ranging between 20% and 90%, preferentially between 30% and 60%.

In generally, this use is also characterized in that the said mineral substance is a natural calcium carbonate.

The following examples will allow a better understanding of the invention, without however limiting its scope.

EXAMPLES

Example 1

This sample illustrates the dry grinding of a natural calcium carbonate which is a Carrara marble. The grinding is performed by means of an apparatus equipped with a ball grinder and a classifier.

The particle size distribution of the original calcium carbonate feeding the grinder is given in table 1.

TABLE 1

| Diameter of particles (mm) | % mass |
| --- | --- |
| 4-2.5 | 7.25 |
| 2.5-1.6 | 9.73 |
| 1.6-0.8 | 11.44 |
| 0.8-0.5 | 5.57 |
| 0.5-0.2 | 23.73 |
| 0.2-0.1 | 23.18 |
| <0.1 | 19.1 |

The Carrara marble was introduced into a 5.7 m$^3$ ball grinder using 8 tons of Cylpeb™ iron grinding balls in the form of cylinders with an average diameter of 16 mm, in order to obtain a ground material:
  with a median diameter less than or equal to 1.8 μm,
  of which 55% by weight of the particles have a diameter less than or equal to 2 μm.

The dry grinding is performed continuously.

On exiting the grinding chamber, the material is directed to a SELEX™ 6S classifier. Its speed of rotation and air flow are controlled at 5,200 rpm and 6,000 m3/h respectively in order to select the fraction of particles with an average diameter less than or equal to a given value and that will constitute the finished product. The fraction of particles remaining with an average diameter greater than this value is recycled to the ball grinder.

The grinding is carried out in such a way that the feed flow of the selector is always equal to 4 tonnes/h and that the quantity of fresh product injected into the ball grinder corresponds to the quantity of selected product exiting the system.

The dry crusher helper agents were introduced into the grinding system at the point of introduction of the fresh material so as to maintain a constant quantity of dry crusher helper agent in relation to the fresh material being supplied to the grinder.

TABLE 2

|  | Test No. | | |
| --- | --- | --- | --- |
|  | 1 | 2 | 3 |
| Type of grinding aid agent | MPG | PEG | Glycerol |
| Prior Art (PA)/Invention (IN) | PA | PA | IN |
| % of particles with a diameter <2 μm | 57 | 57 | 57 |
| % of particles with a diameter <1 μm | 22 | 21 | 23 |
| d50 (μm) | 1.8 | 1.8 | 1.7 |
| BET Surface area (m²g) | 6.3 | 6.9 | 6.9 |

The MPG referenced grinding aid agents consist of aqueous solution containing 75% (by weight) of monopropylene glycol and were obtained from the company FLUKA™.

The PEG referenced grinding aid agents consist of aqueous solutions containing 75% (by weight) of polyethylene glycol with a molecular weight equal to 600 g/mole and were obtained from the company FLUKA™.

Glycerol designates an aqueous solution containing 75% glycerol (by weight).

Each test uses 2,000 ppm of active product (i.e. 2,667 ppm of each aqueous solution).

The calcium carbonates from tests No. 1 to 3 will then be tested in examples 2-4 to quantify their ability to reduce the phenomenon of foaming when dispersed in water, and their ability to be easily dispersed in an aqueous formulation.

Example 2

This example illustrates the effect of the dry grinding agent used on the amount of foam formed when the calcium carbonate resulting from said grinding is dispersed in water.

To do this, a 40% by dry weight aqueous suspension of calcium carbonate is prepared using distilled water. 600 ml of this suspension are introduced into the equipment called the "foam machine" consisting of a centrifugal pump through which the suspension circulates in a loop at a flow rate of 50 l/min., of a 750 ml, 20 cm high graduated vertical glass column for introducing the suspension into the pump, and of an air supply from a pipe installed in the suspension recirculation circuit. This circulation of the suspension is carried out for 10 minutes under continuous bubbling of the air at a constant flow rate of 230-235 ml/min.

At the end of the 10 minute period, the foam height is read directly from the graduations of the column.

TABLE 3

|  | Test No. | | |
| --- | --- | --- | --- |
|  | 1 | 2 | 3 |
| Type of grinding aid agent | MPG | PEG | Glycerol |
| Prior Art (PA)/Invention (IN) | PA | PA | IN |
| Height of foam (cm) | 7 | >20 | 3 |

These results demonstrate that calcium carbonate dry-ground in the presence of glycerol can significantly reduce the amount of foam when the said carbonate is dispersed in water.

Example 3

This example illustrates the manufacture of paints where the formulation uses 3 calcium carbonates dry-ground according to example 1. In each of the tests No. 1 (2nd.) to 3 (2nd.), a flat paint in the aqueous phase is produced by a mixture under agitation of the different constituents in the proportions in grams indicated in table 4.

TABLE 4

|  | Test No. | | |
| --- | --- | --- | --- |
|  | 1 (2nd.) | 2 (2nd.) | 3 (2nd.) |
|  | Prior Art (PA)/Invention (IN) | | |
|  | PA | PA | IN |
| Water | 292.0 | 292.0 | 292.0 |
| Ammonia (31% solution) | 2.0 | 2.0 | 2.0 |
| Ecodis ™ P90 (40% solution) | 4.0 | 4.0 | 4.0 |
| Mergal ™ K6N | 2.0 | 2.0 | 2.0 |
| Byk ™ 034 | 2.0 | 2.0 | 2.0 |
| TiO2 RL68 | 41.0 | 41.0 | 41.0 |
| Durcal ™ 2 | 328.0 | 328.0 | 328.0 |
| CaCO3 dry-ground according to test No. 1 | 215.0 | 0 | 0 |
| CaCO3 dry-ground according to test No. 2 | 0 | 215.0 | 0 |
| CaCO3 dry-ground according to test No. 3 | 0 | 0 | 215.0 |
| Acronal ™ 290D | 82.0 | 82.0 | 82.0 |
| Monopropylene glycol | 10.0 | 10.0 | 10.0 |
| Texanol ™ | 10.0 | 10.0 | 10.0 |
| Rheotech ™ 3000 | 12.0 | 12.0 | 12.0 |
| Total (g) | 1000.0 | 1000.0 | 1000.0 |

Ecodis™ P90 designates a thickener marketed by the company COATEX™, Rheotech™ 3000 designates a thickener marketed by the company COATEX™, Mergal™ K6N designates a bactericide marketed by the company TROY™, Byk™ 034 designates an antifoaming agent marketed by the company BYK™, TiO2 RL68 designates a titanium dioxide powder marketed by the company Millennium™, Durcal™ 2 designates a calcium carbonate marketed by the company OMYA™, Acronal™ 290 D designates a binder marketed by the company BASF™. Texanol™ designates a coalescent agent marketed by the company EASTMANN™, For each of the tests Nos. 1 (2nd.) to 3 (2nd.), the Brookfield™ viscosities at 10 and 100 RPM were determined according to the methods well known to the person skilled in the art.

Also measured were certain optical characteristics of the paints obtained such as the whiteness L, the "3 Hunterlab filters" Sub-tone" and the level of gloss at 85°. The methods implemented are described specifically in document FR 2 872 815. The results are listed in tables 5 and 6.

TABLE 5

|  |  | Test No. | | |
| --- | --- | --- | --- | --- |
|  | Viscosities | 1 (3rd.) PA | 2 (3rd.) PA | 3 (3rd.) IN |
| Time t = 0 | $\mu^B_{10}$ (mPa·s) | 12,400 | 10,000 | 10,700 |
|  | $\mu^B_{100}$ (mPa·s) | 3,400 | 2,800 | 3,100 |

TABLE 5-continued

|  |  | Test No. | | |
| --- | --- | --- | --- | --- |
|  | Viscosities | 1 (3rd.) PA | 2 (3rd.) PA | 3 (3rd.) IN |
| Time t = 24 hours | $\mu^B_{10}$ (mPa·s) | 14,200 | 11,900 | 11,700 |
|  | $\mu^B_{100}$ (mPa·s) | 4,000 | 3,600 | 3,500 |
| Time t = 7 days 50° C. | $\mu^B_{10}$ (mPa·s) | 21,400 | 13,900 | 13,600 |
|  | $\mu^B_{100}$ (mPa·s) | 5,830 | 4,100 | 4,100 |
| Time t = 1 month 50° C. | $\mu^B_{10}$ (mPa·s) | 27,500 | 18,100 | 18,100 |
|  | $\mu^B_{100}$ (mPa·s,) | 7,250 | 5,100 | 5,100 |

$\mu^B_{10}$ (mPa·s): Brookfield ™ viscosity determined at 10 RPM
$\mu^B_{100}$ (mPa·s): Brookfield ™ viscosity determined at 100 RPM

TABLE 6

|  | Test No. | | |
| --- | --- | --- | --- |
|  | 1 (3rd.) | 2 (3rd.) Prior Art (PA)/ Invention (IN) | 3 (3rd.) |
|  | PA | PA | IN |
| Whiteness | | | |
| Measurement of L "3 Hunterlab Filters" Sub-tone | 98.6 | 98.7 | 98.7 |
| Value of a | 0 | 0.1 | 0.1 |
| Value of b | 3.0 | 3.0 | 3.1 |
| Level of gloss | | | |
| 85° | 12.3 | 12.6 | 12.6 |

Compared to the market reference that uses monopropylene glycol as a dry-grinding agent, we have succeeded in improving the auto-dispersant characteristic of calcium carbonate in a paint by the use of the formulation containing glycerol. Indeed, in comparison with test No. 1 (3rd.), one can observe in test No. 3 (3rd.) both a decrease in the initial viscosity, which reflects a good initial state of dispersion, and a lower by-product of this viscosity over time, reflecting a better stability. In addition, the final optical properties are not altered.

Compared to calcium carbonate dry-ground with low molecular weight polyethylene glycol, the same level of performance is revealed, both at the rheological level as well as with respect to the optical properties. Glycerol is thus a solution that is as effective as low molecular weight polyethylene glycol, but is less expensive and most importantly, is derived from a renewable non-food resource that is natural and available in large quantities: It represents a VOC-free alternative that is very beneficial environmentally and for the preservation of our natural resources, which fits in perfectly with the concepts of "green chemistry" and of "sustainable development".

Example 4

This example illustrates the ability of calcium carbonate dry-ground according to the invention (with formulations containing glycerol) or according to the prior art (with a state-of-the-art dry-grinding agent) to disperse in the aqueous phase in the presence of an acrylic dispersant.

For each of the tests 1 (4th.) to 3 (4th.), into a 1-liter beaker, 500 grams of calcium carbonate dry-ground according to tests 1 to 3 respectively are introduced into 175 g of water so as to obtain a 74% by weight dry extract.

To the medium is then added a certain amount of acrylic dispersant (which is a homopolymer of acrylic acid, sodium/calcium 70/30% molar neutralized, with a molecular weight equal to 5,500 g/mol), it is agitated and the Brookfield™ viscosity is measured at 25° C. and 100 RPM.

By repeating these operations for increasing additions of dispersant, one can follow the evolution of the Brookfield™ viscosity at 25° C. and 100 RMP (mPa·s), as a function of the percentage by dry weight of dispersant with respect to the dry weight of calcium carbonate. The corresponding curves appear in FIG. 1/1 with the following symbols:

black triangles for test No. 1 (4th.) with dry-ground carbonate in the presence of PEG
black squares for test No. 2 (4th.) with dry-ground carbonate in the presence of MPG
black circles for test No. 3 (4th.) with dry-ground carbonate in the presence of glycerol FIG. 1/1 clearly shows that at a constant dry extract level (74%), the dry-ground calcium carbonate in the presence of glycerol is the one that requires the lowest dose of dispersant to achieve a given viscosity level; in other words, it is the calcium carbonate which presents the most pronounced auto-dispersant characteristic when put in aqueous suspension in the presence of an acrylic dispersant.

The invention claimed is:

1. A method for improving the auto-dispersant characteristic in water of a mineral substance, the method comprising dry-grinding, in the presence of a formulation, a mineral substance selected from the group consisting of a dolomite, talc, titanium dioxide, alumina, kaolin and calcium carbonate,
wherein:
said formulation comprises glycerol and at least one agent in aqueous or pure form; and
said agent is selected from the group consisting of
glucose,
fructose,
sucrose,
starch,
cellulose having a root mean square of radius of gyration of less than or equal to a modal radius of the mineral substance,
an organic polyacid of formula COOH—$(CH_2)_n$—COOH, where n is an integer between 0 and 7 inclusive,
a mono or dialkaline salt of an organic polyacid of formula COOH—$(CH_2)_n$—COOH, where n is an integer between 0 and 7 inclusive,
a polymeric organic polyacid comprising, in polymerized form, at least one monomer selected from the group consisting of, in the acidic or partially or completely neutralized form, acrylic acid, methacrylic acid, maleic itaconic, an oxalic acid, a pimelic acid, and an adipic acid, and at least one cation of Group I or II of the Periodic Table of the Elements,
an alkanolamine selected from the group consisting of 2-amino-2-methyl-1-propanol, 2-amino-2-ethyl-1,3-propanediol, triethanolamine, N-butyldiethanolamine and triisopropanolamine, neutralized or not, and
a polyethylene glycol, a polypropylene glycol or an ethylene-propylene glycol copolymer, random or block.

2. The method of claim 1, wherein said formulation comprises pure glycerol.

3. The method of claim 1, wherein said formulation comprises aqueous glycerol.

4. The method of claim 3, wherein said formulation comprises from 25% to 95% by weight of glycerol with respect to a total weight of the formulation.

5. The method of claim 1, wherein said agent is an organic polyacid of formula COOH—$(CH_2)_n$—COOH, where n is an integer between 0 and 7 inclusive, or is a mono or dialkaline salt of an organic polyacid of formula COOH—$(CH_2)_n$—COOH, where n is an integer between 0 and 7 inclusive, or is a polymeric organic polyacid comprising, in polymerized form at least one monomer selected from the group consisting of, in the acidic or partially or completely neutralized form, acrylic acid, methacrylic acid, maleic itaconic, an oxalic acid, a pimelic acid, and an adipic acid, and at least one cation of Group I or II of the Periodic Table of the Elements.

6. The method of claim 1, wherein said agent is an alkanolamine selected from the group consisting of 2-amino-2-methyl-1-propanol, 2-amino-2-ethyl-1,3-propanediol, triethanolamine, N-butyldiethanolamine and triisopropanolamine, neutralized or not.

7. The method of claim 1, wherein said agent is a polyethylene glycol, a polypropylene glycol or an ethylene-propylene glycol copolymer, random or block.

8. The method of claim 1, wherein said agent is selected from the group consisting of glucose, fructose, sucrose, starch and cellulose having a root mean square of radius of gyration of less than or equal to a modal radius of the mineral substance.

9. The method of claim 1, wherein said formulation comprises 100 to 5,000 ppm of glycerol or polyglycerol in relation to a dry weight of said mineral substance.

10. The method of claim 1, wherein said formulation is implemented at between 0.1 and 1 mg total dry equivalent of glycerol or polyglycerol per $m^2$ of said mineral substance.

11. The method of claim 1, further comprising grinding said mineral substance to an average diameter measured by a Sedigraph™ 5100 of between 0.5 and 10 μm.

12. The method of claim 1, further comprising grinding said mineral substance to obtain a percentage by weight of particles with a diameter less than 2 μm, as measured by a Sedigraph™ 5100, ranging between 20% and 90%.

13. The method of claim 1, wherein said mineral substance is a natural calcium carbonate.

14. A method for improving the auto-dispersant characteristic in water of a mineral substance, the method comprising dry-grinding, in the presence of a formulation, a mineral substance selected from the group consisting of a dolomite, talc, titanium dioxide, alumina, kaolin and calcium carbonate,
wherein:
said formulation comprises glycerol and at least one agent selected from the group consisting of ethylene glycol, monopropylene glycol, triethylene glycol, an inorganic acid, a salt of an inorganic acid, formic acid, citric acid, a salt of formic, a salt of citric acid, an organic polyacid, a salt of an organic polyacid, an alkanolamine, a polyethylenimine, a polyalkylene glycol polymer with a molecular mass by weight of between 200 g/mol and 20,000 g/mole, a carbohydrate with a root mean square of radius of gyration less than or equal to a modal radius of the mineral substance, and a polyglycerol, such that said agent is aqueous or pure; and
said formulation comprises from 20% to 95% by weight of said glycerol, from 1% to 50% by weight of said agent, and from 0% to 65% by weight of water in relation to a total weight of 100%.

15. The method of claim 14, wherein said agent is a phosphoric acid.

16. The method of claim 14, wherein said agent is a mono, di or trialkaline salt of an inorganic acid.

17. The method of claim 14, wherein said agent is a mono, di or trialkaline salt of formic or citric acid.

18. The method of claim 14, wherein the agent is at least one polyglycerol selected from the group consisting of diglycerol, triglycerol, tetraglycerol, pentaglycerol, hexaglycerol, heptaglycerol, octaglycerol, nonaglycerol, decaglycerol and mixtures thereof.

19. The method of claim 14, wherein said formulation consists of glycerol and at least one agent selected from the group consisting of ethylene glycol, monopropylene glycol, triethylene glycol, an inorganic acid, a salt of an inorganic acid, formic acid, citric acid, a salt of formic, a salt of citric acid, an organic polyacid, a salt of an organic polyacid, an alkanolamine, a polyethylenimine, a polyalkylene glycol polymer with a molecular mass by weight of between 200 g/mol and 20,000 g/mole, a carbohydrate with a root mean square of radius of gyration less than or equal to a modal radius of the mineral substance, and a polyglycerol, such that said agent is aqueous or pure.

20. The method of claim 14, wherein said formulation comprises a polyglycerol and no glycerol.

21. A method for improving the auto-dispersant characteristic in water of a mineral substance, the method comprising dry-grinding, in the presence of a formulation, a mineral substance selected from the group consisting of a dolomite, talc, titanium dioxide, alumina, kaolin and calcium carbonate, wherein said formulation consists of 25% to 95% by weight of a polyglycerol with respect to a total weight, with the complement being constituted by water.

22. The method of claim 21, wherein the polyglycerol is selected from the group consisting of diglycerol, triglycerol, tetraglycerol, pentaglycerol, hexaglycerol, heptaglycerol, octaglycerol, nonaglycerol and decaglycerol and mixtures thereof.

23. The method of claim 21, wherein said formulation consists of 45% to 95% by weight of the polyglycerol with respect to the total weight, with the complement being constituted by the water.

* * * * *